(No Model.)

W. T. Y. SCHENCK.
GASKET FOR MAN HOLES.

No. 326,593. Patented Sept. 22, 1885.

Attest:
F. H. Schott
W. Burris

Inventor:
William T. Y. Schenck
By N. Cranford atty.

UNITED STATES PATENT OFFICE.

WILLIAM T. Y. SCHENCK, OF SAN FRANCISCO, CALIFORNIA.

GASKET FOR MAN-HOLES.

SPECIFICATION forming part of Letters Patent No. 326,593, dated September 22, 1885.

Application filed June 13, 1885. (No model.)

*To all whom it may concern:*

Be it known that I, WILLIAM T. Y. SCHENCK, a citizen of the United State, residing at San Francisco, in the county of San Francisco and State of California, have invented certain new and useful Improvements in Gaskets for Man and Hand Holes in Steam-Boilers, of which the following is a specification, reference being had therein to the accompanying drawings.

This invention relates to the production of gaskets or packings for man-holes and handholes in steam-boilers, and other like places where a gasket is needed in order to make a joint air, water, or steam tight, and gaskets that are cheap, serviceable, and easily and quickly constructed; and the invention consists in the construction of the gaskets as articles of manufacture, as will be fully hereinafter described.

Figure 1:
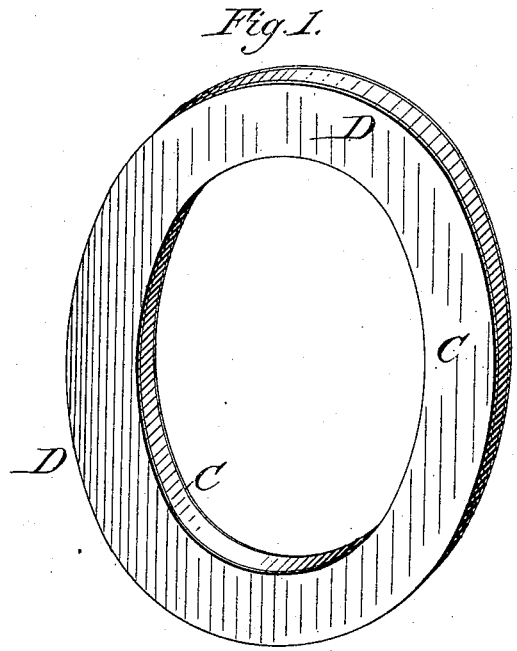
Figure 2:
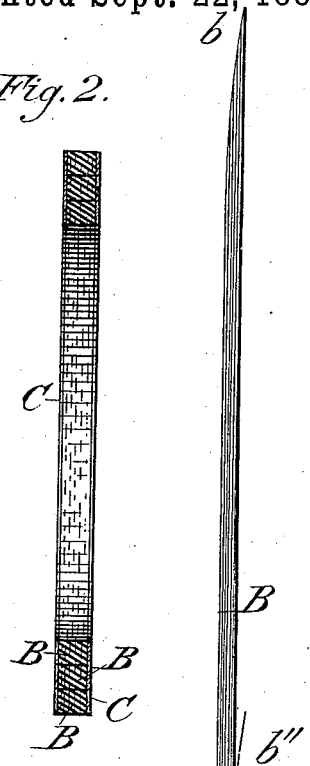
Figure 3:
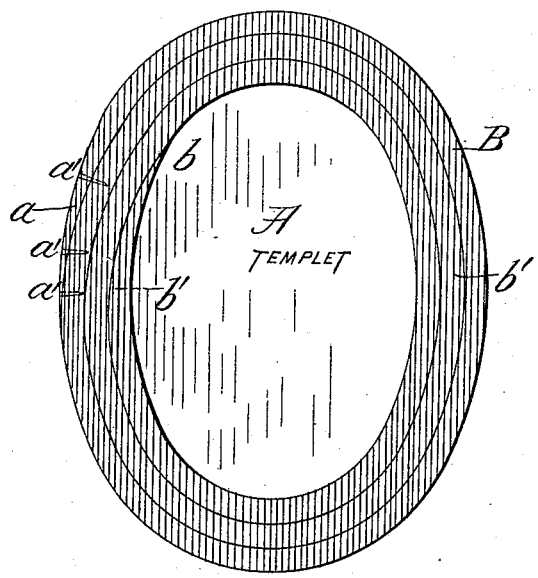
Figure 4:

In the drawings, Figure 1 represents a side view of a finished gasket as made and formed from a strip of sheet-rubber, either vulcanized or unvulcanized, and wound around a templet to give it shape and size; Fig. 2, an edge view of the same, partly in section. Fig. 3 represents a templet or pattern of the inside diameter of a gasket with a strip of sheet-rubber wound around the templet, and Fig. 4 represents the strip of rubber that is to form the gasket.

A represents a wooden templet for the inside of a gasket to a man or hand hole, which man or hand holes are known to be various in size and form. This templet is of the exact size that the center opening in the gasket is to be when completed.

B represents a long strip of vulcanized or unvulcanized sheet-rubber or other suitable material cut from the edge of a web of such material, and long enough to be wound around the templet until it turns or laps form a gasket of the proper diameter on its outside, to tightly fit in the opening in the boiler and under the man or hand hole plates. If a gasket of a large size is wanted, the strip, if not long enough, can be scarfed or brought to an edge at its outer end, as seen at $b$, Fig. 3, so that another length of strip can be spliced thereto to fit and lap over the first strip, as seen in dotted lines at $b''$, Fig. 4. The strip B is scarfed to an edge, as seen at $b$, Fig. 3, and then secured to the templet A by any secure means, such as by a pin or peg, $b'$, until the strip is brought tightly around the templet to and over the scarfed or pointed edge, when cement of any proper material, such as dissolved rubber, is applied to the outside or back of the strip that is wound around the templet, when the pin may be removed; or the pin may remain until the gasket is completed, and then by pushing the templet down on the side opposite the pin, the gasket can be removed from the templet and the pin withdrawn from the rubber. When the strip has been wound around the templet and upon the inner turns and cemented thereto, the outer end is then scarfed off to an edge, as seen at $a$, Fig. 3, and secured in place by cement and a pin or pins, $a'\ a'$, until the cement is fully set, when the pins can be removed, or they may remain, as by remaining no bad effects will follow.

When a gasket is thus constructed by winding the strip B around the templet A and upon itself and secured together as described, and the cement has fully set and holding the different turns of the strip together, it is removed from the templet and a thin piece of cloth, C C, cemented to each of its sides or faces, as seen in Fig. 1. When a gasket so made and treated is placed under pressure to secure the cloth firmly upon the faces of the several turns of the strip B, and when the cloth C is firmly cemented and set to the sides of the gasket, it is removed from the pressure, and is then dressed on its edges to its exact size, and the gasket is complete and ready for use.

If unvulcanized-rubber cloth is used from which the strip is cut, it will not be necessary to cement the edges of the turns, as there exists in this rubber-cloth a quality that, when a slight pressure only is brought to bear upon it, the edges so brought and slightly pressed together will adhere to each other sufficiently without cement to hold the turns together until the facing of cloth is cemented to the faces; or cement alone is used on the faces, either with or without pressure, or the several laps of the strip of rubber, as they are wound around and upon each other, can be held in place by metal or other pins, the same as seen at the ending of the strip, where the pins may remain and the cloth cemented to the faces; or cement alone used instead of the cloth and cement, either with or without pressure.

The strip of rubber may be of any desired width; but I prefer the width to be about equal to the thickness, as it gives better in bending when narrow in width.

As there is no regulation in the sizes of man and hand holes, and the plates or covers vary as the boiler-maker may fancy, and gaskets are made to fit the plates after the plates are made, hence a dealer may have five hundred sizes of gaskets in his stock, and yet the first purchaser may want a size different from any in stock; and as these gaskets have heretofore been made by either cutting them out of a sheet of rubber to the size and form to fit a templet and hole, or by molding the plastic rubber in a metal mold; in either case the production of a gasket is expensive, for if the gasket is cut out of sheet-rubber the center piece and outside trimmings become waste, and if formed in a mold, that mode is expensive, by reason of the large number of molds that must be kept to give all the sizes to fit all the plates. By my way of producing gaskets little or no waste of material is had, and gaskets differing in sizes can be made in a short time, whereas under the present mode of supply, it takes days to produce an off-size by molding, or there is loss by cutting the gasket from a sheet of rubber-cloth or other suitable material.

Following the above-described mode of constructing and producing gaskets, as many as three articles in gaskets can be made by stopping off at different stages intermediate or before the final stage is completed.

Having thus described my invention, what I claim, and desire to secure by Letters Patent, is—

1. As an article of manufacture, a gasket formed from a narrow strip of sheet-rubber wound around a templet to give the size of the center opening, the strip wound circumferentially to increase its diameter to the required size, the several winds cemented on the edges of the strip of each wind, substantially as described.

2. As an article of manufacture, a gasket formed from a narrow strip of sheet-rubber wound around a templet to give the size of the center opening, the strip wound circumferentially to increase its diameter to the required size, the several winds held together by pins or pegs, and the faces of the gasket cemented, substantially as described.

3. As an article of manufacture, a gasket formed from a narrow strip of sheet-rubber wound around a templet to give the size of the center opening, the strip wound circumferentially to increase its diameter to the required size, the several winds held in place by cloth cemented upon each face of the gasket, substantially as described.

In testimony whereof I affix my signature in presence of two witnesses.

WILLIAM T. Y. SCHENCK.

Witnesses:
H. H. WAINWRIGHT,
ARTHUR A. McCLOUGHRY.